United States Patent [19]

Schubert et al.

[11] 4,218,314
[45] Aug. 19, 1980

[54] HYPERFILTRATION SCOOP APPARATUS AND METHOD

[76] Inventors: James P. Schubert, 207 Willow Springs Rd.; Donald K. Todd, Booker Springs Rd., both of Clemson, S.C. 29631

[21] Appl. No.: 926,499

[22] Filed: Jul. 20, 1978

[51] Int. Cl.² .............................................. B01D 13/00
[52] U.S. Cl. .................................. 210/23 H; 210/194; 210/321 R; 210/433 M; 210/483; 55/17; 55/158
[58] Field of Search ................. 210/23 H, 194, 321 R, 210/433 M, 483, 484, 493 M, 500 M, 510; 55/16, 17, 158

[56] References Cited
U.S. PATENT DOCUMENTS

| 3,657,402 | 4/1972 | Stana et al. ................. 210/500 M X |
| 3,676,355 | 7/1972 | Lacey et al. ....................... 210/23 H |

*Primary Examiner*—Charles N. Hart
*Assistant Examiner*—Ferris H. Lander
*Attorney, Agent, or Firm*—Bailey, Dority & Flint

[57] ABSTRACT

The efficiency of membrane separation is enhanced in a hyperfiltration process by scooping off controlled amounts of the boundary layer at desired points along the flow path where useful concentrations have been achieved avoiding the necessity of bringing the entire flow up to desired concentration. The use of porous stainless steel supports with membranes formed therein in situ after fabrication from the pipe sections in a single pass configuration is especially advantageous with scoop apparatus spaced along the length of the stainless supports.

7 Claims, 4 Drawing Figures

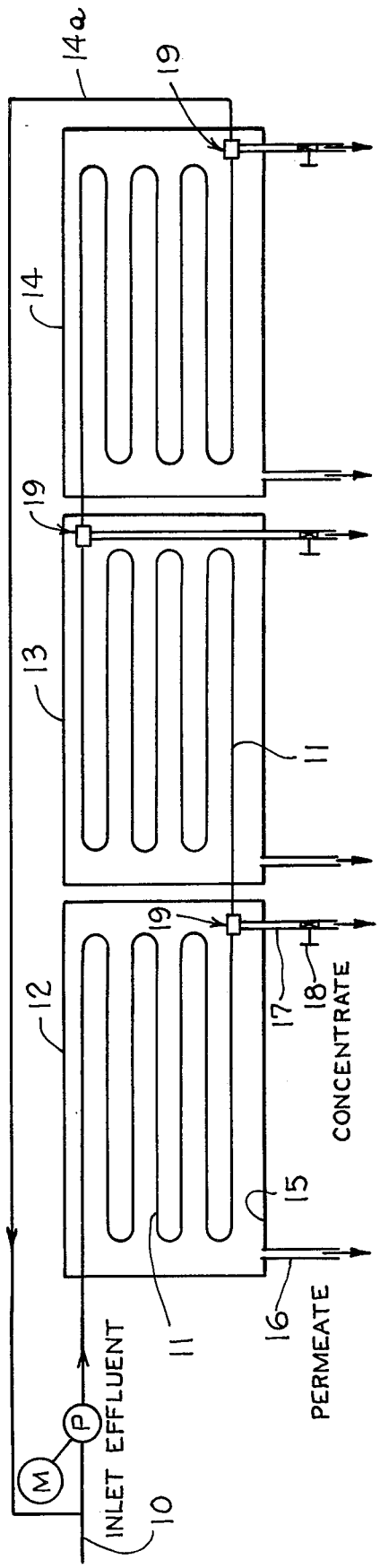
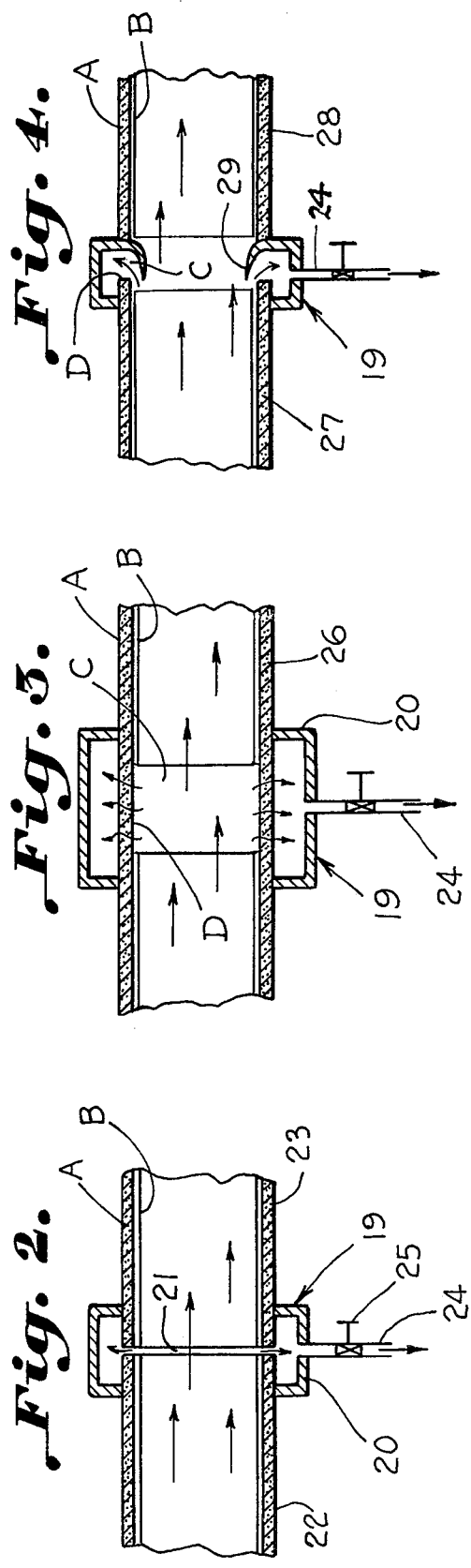

HYPERFILTRATION SCOOP APPARATUS AND METHOD

BACKGROUND OF THE INVENTION

Membrane processes such as hyperfiltration including ultrafiltration, and reverse osmossis operate with selective passage of the water from a solution or suspension of material in the water. The material retained by the membrane, or rejected, is consequently more concentrated near the membrane than it was at the entrance and more than the material more distant from the membrane. The less concentrated liquid and that which is most readily passed is thus separated from the membrane. This phenomenon is sometimes termed "concentration polarization" and is the subject of numerous articles and reports. Since boundary layer concentration is even more pronounced in laminar or less turbulent flow situations, prior efforts to solve the problems engendered thereby have included the use of more turbulent flow conditions but such adds to costs especially from increased power consumption.

While the boundary layer is believed to exist only in theory, what is meant herein by that term is simply the concentrated portions of the flow near the interface between the fluid and the membrane.

BRIEF DESCRIPTION OF THE INVENTION

The invention relates to removal of the concentrated boundary layer for immediate use as a desirable concentrate. The basic device is a scoop which operates to physically remove the concentrated material next to the membrane from the more dilute material far away. The membrane is interrupted at a desired position and the material adjacent its wall is separated from the main flow. The wall region is richer in the waterborne material. The remaining main flow from the system is preferably recirculated to the entrance of the tube, joining the feed flow. By utilizing porous stainless steel supports the achievement of a continuing single pass system is greatly facilitated.

An important advantage of the invention is that membrane fluxes achieved at low concentrations, such as that of the main flow, are higher than those achieved at high concentrations. The scoop selectively removes the high concentration fluid with a minimal increase in main flow concentration, thus allowing the achievement of high concentration of material from a stream of low concentration without forcing the very high concentrating normally achieved when only the main flow is removed at the final exit of a membrane system.

In contrast to the prior art which teaches that the boundary layer should be minimized or removed in order to lessen the problems caused thereby the present invention teaches that the boundary layer may be utilized as a desirable thing because it is already in concentrated form and may advantageously be removed for direct usefulness. Scooping makes possible removal of controlled amounts of the boundary layer at desired points along the flow path after development of the boundary layer achieving predetermined concentration without the necessity of bringing the entire flow up to the desired concentration.

The use of non-rejecting membranes have been suggested for removing and discarding boundary layer material in desalinating water to decrease the adverse effects of concentration polarization. Contrary to this, it is an important object of the present invention to utilize the concentrated boundary layer as it is.

It has been found that ceramic supports are not strong enough to be utilized in practical single pass systems of sufficient length for industrial uses such as in a textile finishing operation because they are not strong enough to withstand the pressures necessitated in such systems even if they could be fabricated and because such cannot be fabricated utilizing practical techniques of fabrication.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a block diagram illustrating a system utilizing the scoop of the present invention wherein the liquid passing through the system, after extracting the permeate and concentrate at selected locations, is recycled into the pressurized inlet effluent, FIG. 2 is a longitudinal sectional elevation illustrating a scoop constructed in accordance with the present invention utilizing a spaced opening between adjacent support sections, FIG. 3 is a longitudinal sectional elevation similar to FIG. 2, illustrating a modified form of the invention wherein the membrane is removed from a circumferential portion of the porous support member, and FIG. 4 is a longitudinal sectional elevation illustrating another modified form of the invention utilizing scoop members extending into the support member projecting through the membrane for withdrawing concentrated boundary layer material.

DESCRIPTION OF A PREFERRED EMBODIMENT

The drawing illustrates an improvement in a hyperfiltration apparatus for increasing the concentration of an effluent for re-use in a fluid treatment process. A permeable tubular structural support member A has a membrane B supported thereby extending along the member. An opening C is provided in the membrane. Thus, the fluid flowing very near the membrane fluid interface is highly concentrated and is removed increasing the efficiency of the hyperfiltration apparatus.

The apparatus illustrated in the drawing might, for example, make possible the drawing off of polyvinyl alcohol 8% concentration for use in a slasher of a textile finishing operation directly from spaced points along a single pass construction. Permeate may be utilized by passing same to the washer. The spent fluid from a slasher as well as the effluent from a washer may again be introduced into the inlet 10 in FIG. 1 under pressure by the pump P driven by the motor M. The several coils 11 are contained in modular units illustrated at 12, 13 and 14, each of which includes a tank 15 having a passageway 16 for permeate as well as a line 17 controlled by a valve 18 permitting the passage of concentrate as discussed above. The scoop apparatus is broadly designated in FIG. 1 at 19 and such may be found in each of the exit portions from the coils of the various modules or otherwise suitably spaced throughout the system. As illustrated in FIGS. 2, 3 and 4, a permeable tubular structural support member A is provided, preferably in the form of a porous stainless steel member, such as those supplied by Mott Metallurgical Corporation of Farmington, Connecticut, having openings of, for example, about 0.5 microns. A suitable membrane is illustrated at B and such may take the form of that illustrated in U.S. Pat. Nos. 3,977,976, 3,743,595, 3,431,201 and 3,503,789, the disclosures of which are incorprated herein and made a part hereof by reference. It is important that the membrane is deposited internally of the stainless steel pipe by being dynamically formed in situ from flowing membrane as described in U.S. Pat. No. 3,503,789 after fabrication.

FIG. 2 illustrates the use of an imperforate collar 20 for receiving the concentrate flowing from the space 21 between adjacent pipe sections 22 and 23. A suitable line 24 containing a valve 25 is provided for carrying off the concentrate for a desired use.

A modified form of the invention is illustrated in FIG. 3 wherein the circumferential opening C is provided in the membrane in a continuous section of pipe 26 while the openings D are the pores within the sintered steel support membrane itself. The collar 20 is provided together with the line 24 for removing concentrate.

A further modification is illustrated in FIG. 4 wherein the scoop includes an opening C within the membrane as well as an opening D between respective sections of pipe 27 and 28 in register therewith. The scoop has an internal projection which faces upstream as illustrated at 29 for actually collecting or scooping the concentrated boundary layer portions of the fluid carried within the support members 27 and 28. Instead of the circumferential openings illustrated, the circumferential projection 29 may be extended in an upstream direction to confine between it and the membrane a substantial portion of the boundary layer. The openings then may be of more limited extent as, for example, formed by extending the pipe 24 through the support and membrane directly into the boundary layer thus confined by the projection.

In the processing of 1% solution of polyvinyl alcohol textile sizing material in wash water, when this wash water is passed, under pressure, over a selected membrane pure water flows into and through the membrane but the polyvinyl alcohol cannot flow into the membrane. Therefore, for each gallon of water flowing through the membrane, about 0.083 pounds (1%) of polyvinyl alcohol is left at the fluid-membrane interface. Since the back-mixing or diffusion of size material into the wash water is slow, an accumulation buildup; i.e., concentration polarization occurs.

The whole objective of the treatment of this wash water is to reconcentrate the size solution. By scooping off the fluid flowing very near the membrane-fluid interface a highly enriched mixture can be collected. This fluid is withdrawn while the mixed-fluid over the entire flow passage cross-section is of a much less average concentration. In the usual prior art process in use only the total fluid at the cross-sectional average concentration is withdrawn.

Thus, it is possible to take advantage of the naturally occuring concentration polarization in the fluid at the interface between a process fluid and a semi-permeable membrane. The idea of the scoop is to withdraw fluid, in a controlled manner, so that primarily just the fluid near the membrane, fluid interface, is withdrawn. This fluid will be of the highest concentration in the species being rejected or separated by the membrane. The scooping of this high concentration region takes advantage of the naturally occuring concentration polarization in the interface region boundary layer to yield a concentrated fraction of process fluid without the necessity of achieving the same high concentration in the mixed-mean of the total fluid in the flow cross section.

It is thus seen that a long single pass hyperfiltration apparatus may be provided through the use of stainless steel porous support members having membranes deposited therein in situ, which may be functionally enhanced through the use of scoops spaced as desired along the single pass configuration. The material may be recycled into the line 14a from the last of the modules to be mixed with the inlet effluent supplied at the inlet 10. The concentrated boundary layer may be removed and utilized directly in the process from whence it came as described earlier herein, thus greatly enhancing the efficiency of the system.

While a preferred embodiment of the invention has been described using specific terms, such description is for illustrative purposes only, and it is to be understood that changes and variations may be made without departing from the spirit or scope of the following claims.

What is claimed:

1. For use in a hyperfiltration apparatus for increasing the concentration of an effluent from a fluid treatment process, the improvement comprising:

a permeable tubular structural support member;

a membrane supported by said tubular structural support member extending along said member internally thereof presenting an open elongated flow path;

an opening in said membrane intermediate the ends of said member;

an opening in said support member in register with said opening in said membrane for flow of boundary layer fluid therethrough; and means for collecting boundary layer fluid passing through said openings;

whereby the fluid flow very near a membrane fluid interface is highly concentrated and may be removed as a concentrate through said openings for collection.

2. The structure set forth in claim 1 including spaced structural support sections and spaced membrane portions forming circumferential openings.

3. The structure set forth in claim 1 including spaced membrane portions with a continuous support member.

4. The structure set forth in claim 1 including an inwardly projecting circumferential member extending across said boundary layer fluid and then facing upstream.

5. The structure set forth in claims, 1, 2, 3, or 4 wherein said structural support member is fabricated from sections of porous stainless metallicpipe and wherein said membrane is deposited in situ upon the interior of said support member after fabrication.

6. The method of increasing the concentration of an effluent from a fluid treatment process comprising the steps of:

passing said effluent under pressure into an elongated tubular continuous hyperfiltration apparatus having a membrane extending along said apparatus internally thereof presenting an open elongated flow path;

forming a boundary layer of predetermined concentration after passage of said effluent through at least a substantial portion of said apparatus;

scooping away the boundary layer of said perdetermined concentration retaining less concentrated portions of effluent; and utilizing the boundary layer thus scooped away in said fluid treatment process.

7. The method set forth in claim 6 including recycling said remaining less concentrated portions of effluent and passing same with the first mentioned effluent into said hyperfiltration aparatus.

* * * * *